(12) United States Patent
Hata et al.

(10) Patent No.: US 10,328,817 B2
(45) Date of Patent: Jun. 25, 2019

(54) CONTROL APPARATUS AND CONTROL METHOD FOR HYBRID VEHICLE

(71) Applicant: TOYOTA JIDOSHA KABUSHIKI KAISHA, Toyota-shi, Aichi-ken (JP)

(72) Inventors: Kensei Hata, Susono (JP); Yuji Iwase, Mishima (JP); Yosuke Suzuki, Susono (JP); Koichi Kato, Nagoya (JP); Seitaro Nobuyasu, Susono (JP); Taro Moteki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 239 days.

(21) Appl. No.: 14/910,605

(22) PCT Filed: Aug. 7, 2014

(86) PCT No.: PCT/IB2014/001480
§ 371 (c)(1),
(2) Date: Feb. 5, 2016

(87) PCT Pub. No.: WO2015/019165
PCT Pub. Date: Feb. 12, 2015

(65) Prior Publication Data
US 2016/0193938 A1 Jul. 7, 2016

(30) Foreign Application Priority Data

Aug. 9, 2013 (JP) .................................. 2013-166021

(51) Int. Cl.
*B60W 20/50* (2016.01)
*B60L 11/18* (2006.01)
(Continued)

(52) U.S. Cl.
CPC .......... *B60L 11/1862* (2013.01); *B60K 6/365* (2013.01); *B60K 6/387* (2013.01);
(Continued)

(58) Field of Classification Search
CPC ....... B60L 11/1862; B60L 7/10; B60W 20/00; B60W 10/26; B60W 10/08; B60W 20/50;
(Continued)

(56) References Cited

U.S. PATENT DOCUMENTS 5,788,006 A 8/1998 Yamaguchi
8,489,268 B2 * 7/2013 Hauptmann ............. B60K 6/48
180/65.21
(Continued)

FOREIGN PATENT DOCUMENTS

| JP | 08-295140 A | 12/1996 |
| JP | 2008-179263 A | 7/2008 |
| JP | 2008-279886 A | 11/2008 |

OTHER PUBLICATIONS

International Search Report in PCT/IB2014/001480, dated Nov. 25, 2014.

*Primary Examiner* — Genna M Mott
(74) *Attorney, Agent, or Firm* — Hunton Andrews Kurth LLP

(57) ABSTRACT

Provided is a control apparatus for a hybrid vehicle, a clutch being provided in a power transmission path leading from an engine to drive wheels, the clutch transmitting torque between the engine and the drive wheels when engaged, the clutch interrupting the transmission of torque between the engine and the drive wheels, the control apparatus including an ECU configured to execute drive control for consuming electric power of a storage device by driving a first motor, when the clutch is kept in a released state and the clutch cannot be engaged and an amount of electrical charge of the storage device is higher than a prescribed first threshold value.

14 Claims, 11 Drawing Sheets

(51) Int. Cl.

| | | |
|---|---|---|
| *B60K 6/387* | (2007.10) | |
| *B60K 6/445* | (2007.10) | |
| *B60W 10/08* | (2006.01) | |
| *B60W 10/26* | (2006.01) | |
| *B60K 6/365* | (2007.10) | |
| *B60K 6/48* | (2007.10) | |
| *B60L 7/10* | (2006.01) | |
| *B60W 20/00* | (2016.01) | |
| *F16H 3/72* | (2006.01) | |
| *F16H 37/08* | (2006.01) | |
| *B60W 50/029* | (2012.01) | |

(52) U.S. Cl.
CPC ............... *B60K 6/445* (2013.01); *B60K 6/48* (2013.01); *B60L 7/10* (2013.01); *B60W 10/08* (2013.01); *B60W 10/26* (2013.01); *B60W 20/00* (2013.01); *B60W 20/50* (2013.01); *B60W 2050/0297* (2013.01); *B60W 2510/0208* (2013.01); *B60W 2510/244* (2013.01); *B60Y 2200/92* (2013.01); *F16H 3/727* (2013.01); *F16H 2037/0866* (2013.01); *F16H 2200/2007* (2013.01); *F16H 2200/2097* (2013.01); *Y02T 10/6239* (2013.01); *Y10S 903/91* (2013.01); *Y10S 903/914* (2013.01)

(58) Field of Classification Search
CPC . B60W 2050/0297; B60W 2510/0208; B60W 2510/244; B60K 6/48; B60K 6/365; B60K 6/387; B60K 6/445; B60Y 2200/92; Y10S 903/914; Y10S 903/91; Y02T 10/6239; F16H 3/727; F16H 2037/0866; F16H 2200/2097; F16H 2200/2007
See application file for complete search history.

(56) References Cited

U.S. PATENT DOCUMENTS

| | | | |
|---|---|---|---|
| 2002/0016660 A1* | 2/2002 | Suzuki | B60K 6/48 |
| | | | 701/62 |
| 2008/0105477 A1* | 5/2008 | Abe | B60W 20/10 |
| | | | 180/65.265 |
| 2008/0314663 A1* | 12/2008 | Yamazaki | B60W 20/13 |
| | | | 180/165 |
| 2009/0011887 A1* | 1/2009 | Komada | B60K 6/36 |
| | | | 475/5 |
| 2010/0145560 A1* | 6/2010 | Komatsu | B60K 6/365 |
| | | | 701/22 |
| 2013/0096761 A1* | 4/2013 | Kuroda | B60K 6/48 |
| | | | 701/22 |

\* cited by examiner

| TRAVEL MODE | K0 CLUTCH<br>ENGAGED : ○<br>RELEASED : — |
|---|---|
| DISENGAGED<br>EV MODE | — |
| NORMAL<br>EV MODE | ○ |
| HV MODE | ○ |

CONTROL APPARATUS AND CONTROL METHOD FOR HYBRID VEHICLE

CROSS REFERENCE TO RELATED APPLICATIONS

This is a national phase application based on the PCT International Patent Application No. PCT/IB2014/001480 filed Aug. 7, 2014, claiming priority to Japanese Patent Application No. 2013-166021 filed Aug. 9, 2013, the entire contents of both of which are incorporated herein by reference.

BACKGROUND OF THE INVENTION

1. Field of the Invention

This invention relates to a control apparatus and a control method for a hybrid vehicle in which an engine and a motor are installed as motive power sources.

2. Description of Related Art

In the related art, there are hybrid vehicles called as one-motor or two-motor vehicle depending on the number of motors functioning as motive power sources installed in the vehicle, and it is a common technique to configure the motor to exercise an electricity generating function. As one example of a one-motor vehicle, Japanese Patent Application Publication No. 2008-179263 (JP 2008-179263 A) discloses a vehicle provided with an engine, a motor having an electricity generating function, and an electric generator which generates electricity by motive power output by the engine, wherein electricity is generated by the electric generator by motive power output from the engine, and this electric power is supplied to the motor, whereby a motor torque is output from the motor and transmitted to drive wheels as a drive torque. Moreover, J P 2008-179263 A discloses generating electricity by the motor through regeneration control of the motor, if an abnormality has occurred in the electric generator.

Furthermore, examples of the configuration of a two-motor vehicle are disclosed in Japanese Patent Application Publication No. 2008-279886 (JP 2008-279886 A) and Japanese Patent Application Publication No. 08-295140 (JP 08-295140 A). JP 2008-279886 A and JP 08-295140 A disclose configurations provided with an engine, two motors that are sources of motive power, and a power split mechanism formed from a planetary gear mechanism in which three rotating elements move differentially, wherein, in the power split mechanism, any one of the rotating elements is coupled to the engine, a further rotating element is coupled to the first motor, and yet a further rotating element is coupled to drive wheels and the second motor. In other words, the motive power output by the engine is divided and transmitted to the first motor side having an electricity generating function and an output member side coupled to drive wheels, by a power split mechanism. Furthermore, due to a reactive force generated by the first motor, it is possible to control the number of revolutions of the engine, as appropriate, in accordance with the number of revolutions of the first motor.

In particular, in the configuration disclosed in JP 08-295140 A, the engine torque is inputted to a carrier of the power split mechanism via an output shaft, and a clutch for mechanically disengaging the output shaft and the engine, and a one-way clutch which stops rotation of the carrier by fixing the output shaft, are provided, in such a manner that the reactive force of the torque produced by the first motor is received by a torque produced by the one-way clutch. Moreover, JP 08-295140 A also indicates that, when the vehicle is travelling by the motive power of the first motor and the second motor, the clutch is released and therefore the engine does not need to be stopped.

SUMMARY OF THE INVENTION

In a hybrid vehicle which has an engine and a motor having an electricity generating function as motive power sources, when decelerating, for example, regeneration control is executed to cause the motor to function as an electric generator, whereby electricity is generated by the motor, which rotates due to external force transmitted from the drive wheels, this electric power is charged to a storage device, such as a battery, and furthermore, by this regeneration control, the vehicle is decelerated due to a regenerative torque outputted from the motor acting on the drive wheels as a braking force.

Furthermore, conventionally, a storage device deteriorates in an overcharged state where the amount of electrical charge therein exceeds a prescribed amount of electrical charge, and therefore the motor is controlled so as not to function as an electrical generator in the event of a overcharged state or a state of charge close to an overcharged state. In this way, JP 2008-179263 A describes prohibiting regeneration control in the event of overcharging. However, since the configuration described in JP 2008-179263 A is a one-motor vehicle, then it is not possible to carry out regeneration control and power travel control simultaneously in the single motor, and therefore if a deceleration request arises when in an overcharged state, regeneration control of the motor is prohibited, and the motor torque cannot act on the drive wheels as a braking force.

Furthermore, in respect of a two-motor configuration, JP 2008-279886 A indicates that, if there is a braking request when the hydraulic brakes are in an abnormal state, then both a regenerative torque produced by regeneration control of the second motor, and torque produced by rotational resistance of the engine, are caused to act on the drive wheels as braking forces. However, in a configuration where a clutch is provided between the engine and the drive wheels, as in the power train described in JP 08-295140 A which also discloses a two-motor configuration, supposing that it becomes impossible to engage the clutch and the clutch is kept in a released state, due to the occurrence of a problem of some kind, or the like, then since the engine is disengaged from the power transmission system, a situation may occur where it becomes impossible to transmit the torque produced by the rotational resistance of the engine, as a braking torque, to the drive wheels, as in the configuration disclosed in JP 2008-279886 A. On the other hand, even if the clutch is kept in a released state and cannot be engaged, according to the composition described in JP 08-295140 A, it is possible to perform regeneration control of the motor so as to generate electricity, and therefore the motor torque produced by this regeneration control can compensate for the torque due to rotational resistance of the engine that ought to be acting as a braking force in the event of a braking request such as that described above, and as a result of this, the amount of generated electricity increases and the storage device is liable to reach an overcharged state. In this way, in a hybrid vehicle provided with a clutch for disengaging an engine from a power transmission system, there is scope for investigation into technology for avoiding the occurrence of an overcharged state of the storage device, in cases where the clutch cannot be engaged and is kept in a released state.

This invention provides a control apparatus and a control method for a hybrid vehicle provided with a clutch for disengaging an engine from a power transmission system, wherein the vehicle is configured so as to avoid the state of charge of a storage device from becoming overcharged.

The control apparatus relating to a first aspect of this invention is a control apparatus for a hybrid vehicle, the hybrid vehicle including an engine, a first motor, a second motor, a storage device, a first rotating element, a second rotating element, a third rotating element, an output member, a power split mechanism and a clutch, the first motor and the second motor respectively having an electricity generating function, the storage device supplying electric power for driving the first motor and the second motor and being charged with electric power generated by at least one of the first motor and the second motor, the first rotating element being coupled to the engine, the second rotating element being coupled to the first motor, the third rotating element being coupled to the output member and the second motor, the power split mechanism producing a differential action in the first rotating element, the second rotating element and the third rotating element, and the clutch being provided in a power transmission path leading from the engine to drive wheels, the clutch transmitting torque between the engine and the drive wheels when engaged, and the clutch interrupting the transmission of torque between the engine and the drive wheels when released, the control apparatus including: an electronic control unit (ECU) configured to execute drive control for consuming electric power of the storage device by driving the first motor, when the clutch is kept in a released state and the clutch cannot be engaged and an amount of electrical charge of the storage device is higher than a prescribed first threshold value.

According to this aspect, in a hybrid vehicle in which a clutch is provided in a power transmission path leading from an engine to drive wheels, even if the clutch is kept unintentionally in a released state and cannot be engaged, the first motor is driven so as to consume electric power of the storage device if the amount of electrical charge is greater than the first threshold value, and therefore overcharging of the storage device can be avoided. Consequently, since the electric power generated by the second motor functioning as an electric generator can be charged to a storage device, then the regenerative torque produced by the second motor during deceleration, for example, can be transmitted to the drive wheels as braking torque. Moreover, the motor torque produced by regeneration control of the second motor can be used as braking torque, and therefore if the vehicle is decelerating continuously, for example, on a downhill road, or the like, then it is possible to reduce the frequent operation of the brake pedal, and hence the durability of the brakes can be improved.

In the control apparatus relating to a first aspect of this invention, the ECU may be configured to stop the drive control, when the amount of electrical charge has become lower than a second threshold value due to the drive control. The second threshold value may be a value smaller than the first threshold value.

According to this aspect, in cases where the clutch cannot be engaged, it is possible to prevent overcharging of the storage device, as well as being able to ensure that the storage device contains the amount of electric power required for motor-powered travel. In other words, the state of charge of the storage device can be kept in a state which enables travel of the hybrid vehicle and halting of the hybrid vehicle.

In the control apparatus relating to the first aspect of this invention, the ECU may be configured to execute the drive control when the amount of electrical charge is predicted to become higher than the first threshold value.

According to this aspect, if it is predicted that the amount of electrical charge in the storage device will become higher than the first threshold value, then drive control for preventing overcharging in advance can be executed. For example, if road information from a car navigation system, or the like, indicates that the travel path of the vehicle includes a downhill road if the vehicle continues travelling and if, for example, that downhill road has a long length or steep gradient, or the like, then it is possible to prevent situations where the storage device becomes overcharged and the motor torque cannot be used as a braking torque.

The control apparatus relating to the first aspect of this invention, the hybrid vehicle may include an oil pump and auxiliary equipment coupled to the first motor. The ECU may be configured to cause the first motor subjected to the drive control to rotate in a direction of rotation for driving the oil pump and the auxiliary equipment.

According to this aspect, it is possible to drive the oil pump and auxiliary equipment by driving rotation of the first motor, and therefore the amount of power consumed in the storage device can be increased.

In the control apparatus relating to a first aspect of this invention, the power split mechanism may be a single pinion planetary gear mechanism that includes a sun gear, a carrier and a ring gear, as rotating elements. The third rotating element may be either the sun gear or the ring gear. The ECU may be configured to execute the drive control in such a manner that the number of revolutions of the first rotating element is greater than the number of revolutions of the third rotating element.

According to this aspect, since the power split mechanism is formed from a single pinion planetary gear mechanism and the output element is formed from either one of the sun gear and the ring gear, then by controlling the driving of the first motor in such a manner that the rotating element coupled to the first motor has a higher number of revolutions than the number of revolutions of the output element, the energy loss in the power split mechanism is increased and therefore the amount of power consumed in the storage device can be raised. In this case, the rotating elements other than the output element rotate faster than the output element, the autonomous number of revolutions of the pinion gear increases, and therefore the energy loss increases.

In the control apparatus relating to a first aspect of this invention, the power split mechanism may be a double pinion planetary gear mechanism that includes a sun gear, a carrier and a ring gear, as rotating elements. The third rotating element may be either the sun gear or the carrier. The ECU may be configured to execute the drive control in such a manner that the number of revolutions of the first rotating element is greater than the number of revolutions of the third rotating element.

According to this aspect, since the power split mechanism is formed from a double pinion planetary gear mechanism and the output element is formed from either one of the sun gear and the carrier, then by controlling the driving of the first motor in such a manner that the rotating element coupled to the first motor has a higher number of revolutions than the number of revolutions of the output element, the energy loss in the power split mechanism is increased and therefore the amount of power consumed in the storage device can be raised. In this case, the rotating elements other than the output element rotate faster than the output element, the autonomous number of revolutions of the pinion increases, and therefore the energy loss increases.

In the control apparatus relating to the first aspect of this invention, the ECU may be configured to execute the drive control when the vehicle does not travel backwards.

According to this aspect, if the vehicle is travelling forwards, or is stationary, the drive control of the first motor can be performed so as to consume electric power from the storage device, and therefore overcharging of the storage device can be avoided. In other words, since the drive control of the first motor described above is prohibited if the vehicle is travelling backwards, then the drive torque during backwards travel can be stabilized. For example, if the drive control of the first motor described above were to be executed during backwards travel and while decelerating, then the torque produced by the first motor would act on the drive wheels in the opposite direction to the braking torque produced by regeneration control of the second motor. Therefore, it is possible to prevent decline in the braking force due to decrease in the braking torque as a result of the torque of the first motor, and to prevent acceleration in the backward direction due to the torque of the first motor having a greater action than the braking torque.

In the control apparatus relating to the first aspect of this invention, the ECU may be configured to execute regeneration control of the second motor, as well as executing the drive control, when the vehicle decelerates.

According to this aspect, since the electric power can be consumed by the first motor while being generated by the second motor, in a state where the clutch is released, then it is possible to avoid overcharging of the storage device.

The control method relating to a second aspect of this invention is a control method for a hybrid vehicle, the hybrid vehicle including an engine, a first motor, a second motor, a storage device, a first rotating element, a second rotating element, a third rotating element, an output member, a power split mechanism, a clutch and an ECU, the first motor and the second motor respectively having an electricity generating function, the storage device supplying electric power for driving the first motor and the second motor and being charged with electric power generated by at least one of the first motor and the second motor, the first rotating element being coupled to the engine, the second rotating element being coupled to the first motor, the third rotating element being coupled to the output member and the second motor, the power split mechanism producing a differential action in the first rotating element, the second rotating element and the third rotating element, and the clutch being provided in a power transmission path leading from the engine to drive wheels, the clutch transmitting torque between the engine and the drive wheels when engaged, and the clutch interrupting the transmission of torque between the engine and the drive wheels when released, the control method including: executing drive control, by the ECU, for consuming electric power of the storage device by driving the first motor, when the clutch is kept in a released state and the clutch cannot be engaged and an amount of electrical charge of the storage device is higher than a prescribed first threshold value.

According to this aspect, in a hybrid vehicle in which a clutch is provided in a power transmission path leading from an engine to drive wheels, even if the clutch is kept unintentionally in a released state and cannot be engaged, the first motor is driven so as to consume electric power of the storage device if the amount of electrical charge is greater than the first threshold value, and therefore overcharging of the storage device can be avoided. Consequently, since the electric power generated by the second motor functioning as an electric generator can be charged to a storage device, then the regenerative torque produced by the second motor during deceleration, for example, can be transmitted to the drive wheels as braking torque. Moreover, the motor torque produced by regeneration control of the second motor can be used as braking torque, and therefore if the vehicle is decelerating continuously, for example, on a downhill road, or the like, then it is possible to reduce the frequent operation of the brake pedal, and hence the durability of the brakes can be improved.

In the control method relating to the second aspect of this invention, the drive control may be stopped by the ECU, when the amount of electrical charge has become lower than a second threshold value due to the drive control. The second threshold value may be a value smaller than the first threshold value.

According to this aspect, in cases where the clutch cannot be engaged, it is possible to prevent overcharging of the storage device, as well as being able to ensure that the storage device contains the amount of electric power required for motor-powered travel. In other words, the state of charge of the storage device can be kept in a state which enables travel of the hybrid vehicle and halting of the hybrid vehicle.

In the control method relating to the second aspect of this invention, the drive control may be executed by the ECU, when the amount of electrical charge is predicted to become higher than the first threshold value.

According to this aspect, if it is predicted that the amount of electrical charge in the storage device will become higher than the first threshold value, then drive control for preventing overcharging in advance can be executed. For example, if road information from a car navigation system, or the like, indicates that the travel path of the vehicle includes a downhill road if the vehicle continues travelling and if, for example, that downhill road has a long length or steep gradient, or the like, then it is possible to prevent situations where the storage device becomes overcharged and the motor torque cannot be used as a braking torque.

In the control method relating to the second aspect of this invention, the hybrid vehicle may further include an oil pump and auxiliary equipment coupled to the first motor. The first motor subjected to the drive control may be caused by the ECU to rotate in a direction of rotation for driving the oil pump and the auxiliary equipment.

According to this aspect, it is possible to drive the oil pump and auxiliary equipment by driving rotation of the first motor, and therefore the amount of power consumed in the storage device can be increased.

In the control method relating to the second aspect of this invention, the power split mechanism may be a single pinion planetary gear mechanism that includes a sun gear, a carrier and a ring gear, as rotating elements. The third rotating element may be either the sun gear or the ring gear. The drive control may be executed by the ECU in such a manner that the number of revolutions of the first rotating element is greater than the number of revolutions of the third rotating element.

According to this aspect, since the power split mechanism is formed from a single pinion planetary gear mechanism and the output element is formed from either one of the sun gear and the ring gear, then by controlling the driving of the first motor in such a manner that the rotating element coupled to the first motor has a higher number of revolutions than the number of revolutions of the output element, the energy loss in the power split mechanism is increased and therefore the amount of power consumed in the storage device can be raised. In this case, the rotating elements other than the output element rotate faster than the output element, the autonomous number of revolutions of the pinion gear increases, and therefore the energy loss increases.

In the control method relating to the second aspect of this invention, the power split mechanism may be a double pinion planetary gear mechanism that includes a sun gear, a carrier and a ring gear, as rotating elements. The third rotating element may be either the sun gear or the carrier. The drive control may be executed by the ECU in such a manner that the number of revolutions of the first rotating element is greater than the number of revolutions of the third rotating element.

According to this aspect, since the power split mechanism is formed from a double pinion planetary gear mechanism and the output element is formed from either one of the sun gear and the carrier, then by controlling the driving of the first motor in such a manner that the rotating element coupled to the first motor has a higher number of revolutions than the number of revolutions of the output element, the energy loss in the power split mechanism is increased and therefore the amount of power consumed in the storage device can be raised. In this case, the rotating elements other than the output element rotate faster than the output element, the autonomous number of revolutions of the pinion increases, and therefore the energy loss increases.

In the control method relating to the second aspect of this invention, regeneration control of the second motor and the drive control may be executed by the ECU, when the vehicle does not travel backwards.

According to this aspect, if the vehicle is travelling forwards, or is stationary, the drive control of the first motor can be performed so as to consume electric power from the storage device, and therefore overcharging of the storage device can be avoided. In other words, since the drive control of the first motor described above is prohibited if the vehicle is travelling backwards, then the drive torque during backwards travel can be stabilized. For example, if the drive control of the first motor described above were to be executed during backwards travel and while decelerating, then the torque produced by the first motor would act on the drive wheels in the opposite direction to the braking torque produced by regeneration control of the second motor. Therefore, it is possible to prevent decline in the braking force due to decrease in the braking torque as a result of the torque of the first motor, and to prevent acceleration in the backward direction due to the torque of the first motor have a greater action than the braking torque.

In the control method relating to the second aspect of this invention, regeneration control of the second motor may be executed by the ECU and to execute the drive control, when the vehicle decelerates.

According to this aspect, since the electric power can be consumed by the first motor while being generated by the second motor, in a state where the clutch is released, then it is possible to avoid overcharging of the storage device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

This invention is described in concrete terms below. This invention is an apparatus which controls a hybrid vehicle provided with an engine and a motor having an electricity generating function, as motive power sources. In a vehicle of this kind, in addition to travel by means of the engine and travel by means of the engine and the motor, the vehicle may also perform travel using only the motor as a motive power source, travel in which energy generation is carried out by the motor, and so on. Moreover, it is possible to control the vehicle to a drive mode in which, for example, the engine is stopped and the engine is restarted, during travel by the motor. In so-called EV travel in which the vehicle travels using the motor as a motive power source, it is desirable to suppress power loss due to turning over of the engine. Furthermore, if a plurality of motors are provided as motive power sources, and if the vehicle is travelling in EV travel mode by any one of the motors, then it is desirable to reduce power loss caused by turning over of a motor that is not outputting motive power, as well as the engine. Due to requirements of this kind, there are cases where a clutch is provided to disengage the engine from the power transmission system which transmits motive power to the drive wheels, and this invention is applied to a control apparatus which is designed for a hybrid vehicle provided with a clutch of this type.

Figure 1:
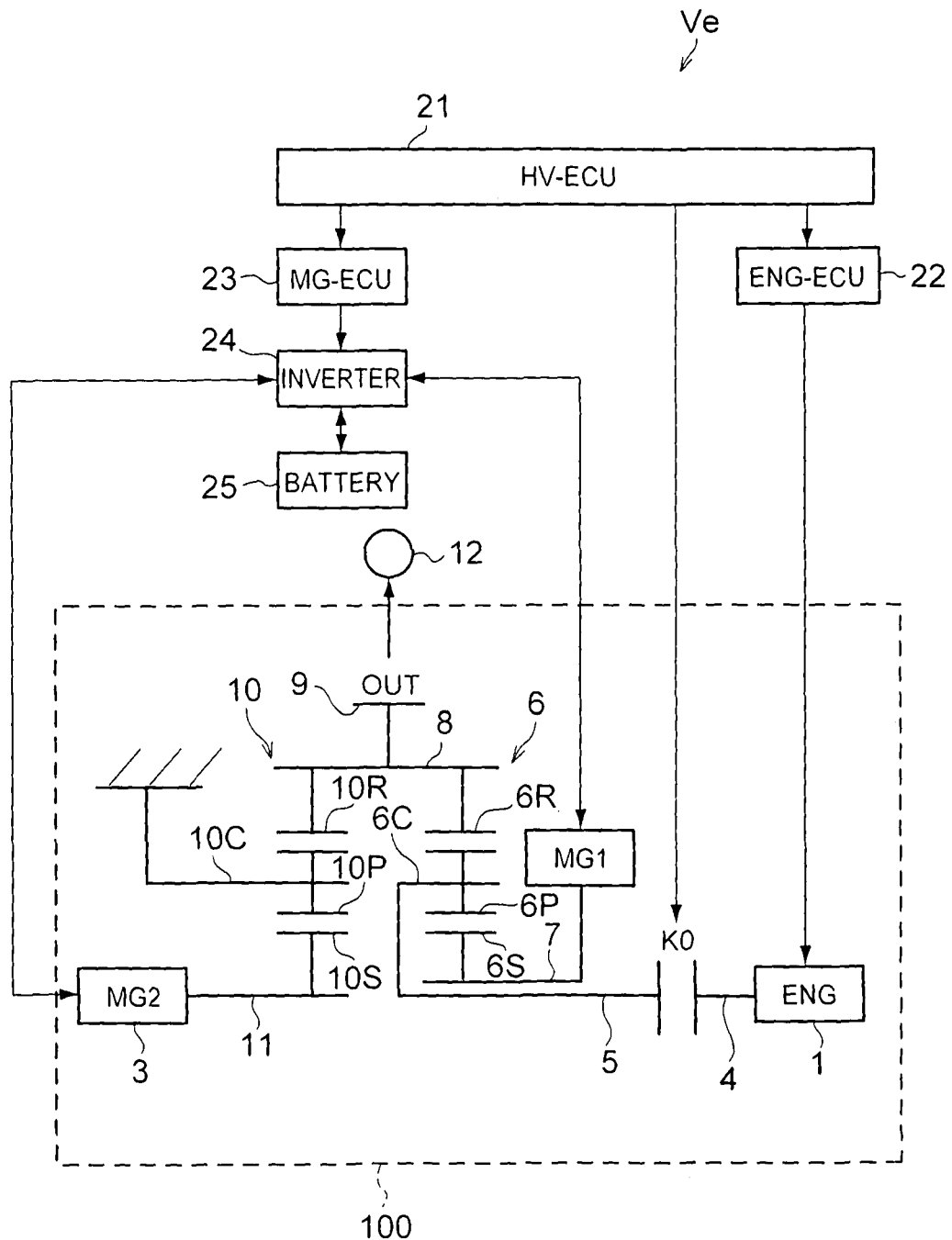
FIG. 1 is an illustrative diagram showing a portion of a power train, and an ECU, to which this invention can be applied.

FIG. 1 shows one example of a power train to which this invention can be applied. As shown in FIG. 1, the hybrid vehicle Ve according to this concrete example is a so-called two-motor vehicle, which is provided with, as motive power sources, an engine (ENG) 1 that outputs motive power by combustion of fuel, and a first motor-generator (MG1) 2 and a second motor-generator (MG2) 3 that have a function for outputting motive power by receiving supply of electric power, and a function for generating electricity by being forcibly rotated by a mechanical external force. The engine 1 is an internal combustion engine which uses fuel, such as a gasoline engine, diesel engine, or gas engine, or the like. The motor-generators 2, 3 are configured so as to be driven by being supplied with electric power from a battery 25 or supply generated electric power to the battery 25. As shown in FIG. 1, the motor-generators 2, 3 are each electrically connected, via an inverter 24, to a storage device (battery) 25 formed from a storage battery, and to another motor-generator.

Furthermore, in the power train 100 shown in FIG. 1, a portion of the motive power outputted by the engine 1 is transmitted to drive wheels 12 via mechanical means, while the other portion of the motive power outputted by the engine 1 is converted temporarily into electric power, and is subsequently converted into mechanical motive power and transmitted to the drive wheels 12. In this concrete example, a power split mechanism 6 is provided as the mechanical means, and the power split mechanism 6 is formed from a differential mechanism which generates a differential action by three rotating elements, and is composed, for instance, by a single-pinion type of planetary gear mechanism. The power split mechanism 6 is provided with, as the three rotating elements, a sun gear 6S which is an externally toothed gear, a ring gear 6R which is arranged concentrically with respect to the sun gear 6S, and a carrier 6C which holds a pinion gear 6P that meshes with the sun gear 6S and the ring gear 6R so as to be independently or communally rotatable.

More specifically, the carrier 6C of the power split mechanism 6 is coupled so as to rotate in an integrated fashion with a rotating shaft (input shaft) 5. Furthermore, in the torque transmission path from the engine 1 to the drive wheels 12, a clutch K0 is provided between the input shaft 5 and the output shaft (crankshaft) 4 of the engine 1. In other words, when travelling by the motive power of the engine 1, the carrier 6C is an input element. Furthermore, the clutch K0 couples the engine 1 to the power transmission system, such as the power split mechanism 6, or disengages the engine 1 from the power transmission system. Furthermore, the clutch K0 according to this concrete example is formed from a frictional clutch in which the transmission torque capacity changes continuously from a "zero" state which is a fully released state, to a fully engaged state, where there is no slippage. The frictional clutch may be either a conventionally available dry or wet clutch, and may be a single-plate or multiple-plate clutch. Moreover, the actuator which changes the engaged and disengaged state of the clutch K0 may be a hydraulic actuator or an electromagnetic actuator, or the like. For example, in the case of a dry single-plate clutch which is used in a conventional vehicle, an engaged state is maintained by a so-called "return mechanism", such as a diaphragm spring, by setting the actuator to a non-operational state. Consequently, the transmission torque capacity of the clutch K0 changes in accordance with the amount of operation of the actuator for engaging and releasing the clutch K0, and there is a correlation between these two factors. More specifically, there is a substantially proportional relationship between the hydraulic pressure, or the current value, or the stroke, of the actuator, and the transmission torque capacity, and therefore the transmission torque capacity is previously determined as a value which corresponds to the amount of operation, such as the stroke amount or the hydraulic pressure, of the actuator, and can be prepared in a map format, or the like. If the coefficient of friction changes over time, then the relationship between the transmission torque capacity and the amount of operation varies.

Moreover, a rotor shaft 7 which rotates in an integrated fashion with the rotor of the first motor-generator 2 is coupled so as to rotate in an integrated fashion with the sun gear 6S of the power split mechanism 6. More specifically, the sun gear 6S is coupled to the first motor-generator 2 via a rotor shaft 7. Furthermore, the first motor-generator 2 is a motor having an electricity generating function, which is formed from a permanent magnet synchronous motor, for instance. Moreover, the ring gear 6R of the power split mechanism 6 is integrated with the output gear 9, and the power train 100 is composed so as to output motive power from the output gear 9 towards the drive wheels 12. More specifically, the output gear 9 is an output member, and the output shaft 8, which is an axle part, is integrated with the output gear 9 and the ring gear 6R. Consequently, the ring gear 6R is an output element, and the sun gear 6S is a reactive element when the vehicle is travelling by the motive force of the engine 1. The example shown in FIG. 1 illustrates a portion of a power train from a motive power source to the drive wheels 12, and the mechanism for transmitting motive power from the output gear 9 to the drive wheels 12 is provided with a differential gear or drive shaft, which is similar to a conventional vehicle and therefore a detailed description thereof is not given here.

Furthermore, in this concrete example, the engine 1, the power split mechanism 6 and the first motor-generator 2 are arranged such that the respective central axes of rotation thereof are arranged on the same axial line, and the second motor-generator 3 is arranged on an extension of this axial line. The second motor-generator 3 generates motive power for travel, and also performs regeneration of energy, and similarly to the first motor-generator 2, is formed from a permanent magnet type of synchronous electric motor, or the like. The second motor-generator 3 and the output gear 9 described above are coupled via a speed reducing mechanism 10 constituted by a gear train.

The speed reducing mechanism 10 in this concrete example is formed from a single pinion type of planetary gear mechanism, similarly to the power split mechanism 6 described above, and a rotor shaft 11 which rotates in an integrated fashion with the rotor of the second motor-generator 3 is coupled so as to rotate in an integrated fashion with the sun gear 10S. Furthermore, the carrier 10C of the speed reducing mechanism 10 is coupled to and fixed to a fixed part, such as a housing, and furthermore the ring gear 10R is integrated with the output gear 9. In other words, the ring gear 10R of the speed reducing mechanism 10 is integrated with the output shaft 8 and rotates in an integrated fashion with the ring gear 6R of the power split mechanism 6. Consequently, a configuration is adopted in which the motive power output from the second motor-generator 3 is transmitted from the output gear 9 towards the drive wheels 12, via the speed reducing mechanism 10.

Furthermore, the vehicle Ve is equipped with an ECU which controls the vehicle Ve, and the ECU includes: a hybrid ECU that controls the power train 100 (hereinafter called "HV-ECU") 21, an engine ECU (hereinafter called "ENG-ECU") 22, and a motor-generator ECU (hereinafter called "MG-ECU") 23. These ECUs are principally constituted by a microcomputer, and perform calculations using input data and data that has been stored previously, in such a manner that the calculation results are output as a control command signal. Consequently, the HV-ECU 21 is configured to output control command signals to the ENG-ECU 22 and the MG-ECU 23, so as to execute the controls of respective types described below. Furthermore, the power train 100 is configured so as to include the engine 1, the motor-generators 2, 3, the clutch K0 and the power split mechanism 6, and the HV-ECU 21 is configured to output control command signals to the actuator of the clutch K0 so as to control the operation and state of the clutch K0.

The ENG-ECU 22 is configured to output various calculation results to the engine 1 as engine control command signals, so as to control driving of the engine 1. Consequently, the engine 1 is composed in such a manner that the output, starting and stopping thereof are controlled electrically; for example, if the engine is a gasoline engine, then the throttle opening, the amount of fuel supplied, the halting of the supply of fuel, the execution and stopping of ignition, the ignition timing, and the like, are controlled electrically.

Furthermore, the MG-ECU 23 is composed so as to output calculation results of various types to the inverter 24 as motor-generator control command signals. Therefore, the motor-generators 2, 3 are configured so as to function as a motor or an electrical generator, by controlling the current of the inverter 24 by the MG-ECU 23, and the torques thereof are controlled respectively when exercising a motor function and when exercising an electricity generating function. When the ECUs 21, 22, 23 are not to be distinguished in particular, then they may be referred to simply as the ECU or ECUs.

Figures 2, 3:
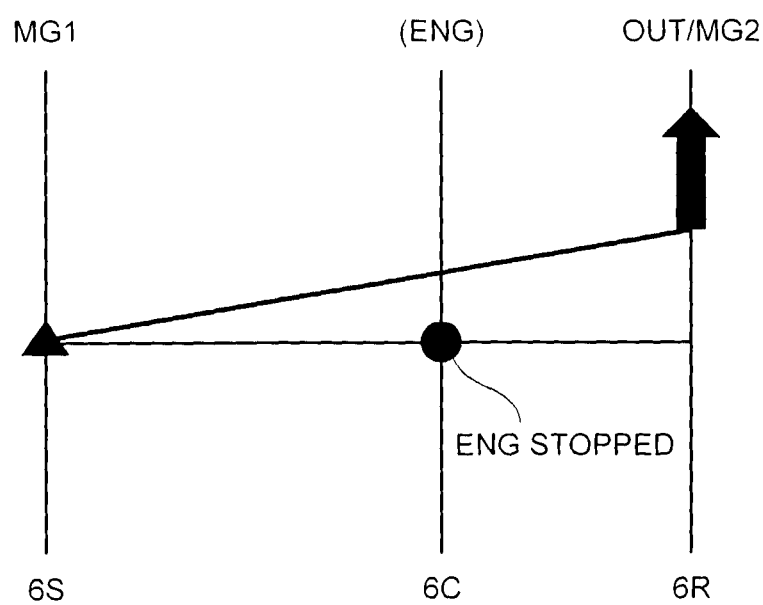
FIG. 2 is a chart showing an engaged state and a released state of the clutch in each travel mode.
FIG. 3 is an alignment chart showing a case where a disengaged electric vehicle (EV) mode is set.

Under the control of the ECUs, in the hybrid drive apparatus shown in FIG. 1, it is possible to set a hybrid travel mode (HV mode) in which the vehicle travels by the motive power of the engine 1, and an electric vehicle travel mode (EV mode) in which the vehicle travels by electric power. Moreover, in the EV mode, it is possible to set either a "disengaged EV mode" in which the engine 1 is disengaged from the power transmission system, or a "normal mode" in which the engine 1 is coupled to the power transmission system. In other words, the vehicle is switched to the respective modes in accordance with the state of the clutch K0, and FIG. 2 shows an overall view of the state of engagement and release of the clutch K0 when each of these respective travel modes is set. As shown in FIG. 2, in the disengaged EV mode, the clutch K0 is released, whereas in the normal EV mode and the HV mode, the clutch K0 is engaged.

Moreover, these travel modes are selected in accordance with the state of travel of the vehicle, namely, the drive request amount, such as the accelerator depression amount or the vehicle speed, the state of charge (SOC) of the battery 25, and the like. For example, if the vehicle is travelling at a certain speed, and the accelerator depression amount has been increased by a certain amount so as to maintain this vehicle speed, then the HV mode is set. As opposed to this, if the SOC is sufficiently large and the accelerator depression amount is comparatively small, or in the case of a travel state where there is a high possibility of restarting the engine 1 which has been stopped automatically, or the like, the normal EV mode is set. Moreover, if, for example, the EV mode is selected by manual operation by the driver, or if travel is possible by electric power only and it is necessary to suppress the loss of motive power caused by turning over of the first motor-generator 2, or the like, then the disengaged EV mode is selected.

The operational state of the hybrid drive apparatus in the respective travel modes is described briefly here. FIG. 3 is an alignment chart relating to the power split mechanism 6, and this alignment chart indicates the sun gear 6S and the carrier 6C, which are rotating elements, by vertical lines, the intervals between these lines corresponding to the gear ratios of the planetary gear mechanism which constitutes the power split mechanism 6, the upward/downward direction with respect to the horizontal line in each of the vertical lines indicating the direction of rotation, and the position in the upward/downward direction indicating the number of revolutions. The alignment chart shown in FIG. 3 indicates an operational state in the disengaged EV mode, and in this travel mode, the second motor-generator 3 is caused to function as a motor, the vehicle travels by the motive power from same, and the engine 1 is disengaged from the power transmission system by releasing the clutch K0 and is stopped, in addition to which the first motor-generator 2 is also stopped. Therefore, the rotation of the sun gear 6S stops, and in response to this, the ring gear 6R rotates forwards with the output gear 9, and the carrier 6C rotates forwards with the number of revolutions which is reduced in accordance with the gear ratio of the planetary gear mechanism with respect to the number of revolutions of the ring gear 6R.

Furthermore, although not shown in the alignment chart, in the operation state in normal EV mode, the vehicle travels by the motive power of the second motor-generator 3, and the engine 1 is stopped, and therefore the ring gear 6R rotates forwards and the sun gear 6S rotates in reverse, with the carrier 6C in a fixed state. In this case, the first motor-generator 2 can also be made to function as an electric generator.

Moreover, in an operational state in the HV mode, the engine 1 outputs motive power with the clutch K0 in an engaged state, and therefore a torque acts on the carrier 6C causing same to rotate forwards. In this state, a torque in the reverse direction of rotation acts on the sun gear 6S, by causing the first motor-generator 2 to function as an electric generator. As a result of this, a torque arises in the ring gear 6R in a direction causing same to rotate forwards. In this case, the electric power generated by the first motor-generator 2 is supplied to the second motor-generator 3, the second motor-generator 3 functions as a motor, and this motive power is transmitted to the output gear 9. Consequently, in the HV mode, as described above, a portion of the motive power outputted by the engine 1 is transmitted to the output gear 9 via the power split mechanism 6, in addition to which the remaining motive power is transmitted by the first motor-generator 2 and converted into electric power by the first motor-generator 2, and is then converted into mechanical motive power by the second motor-generator 3 to which the electric power has been supplied and is transmitted to the output gear 9. In any of the travel modes, if there is no need to actively output motive power, for instance, when decelerating, then either of the motor-generators 2 and 3 is caused to function as an electric motor and regeneration of energy is performed.

As described above, in the hybrid vehicle which is the object of this invention, the vehicle can travel by electric power by releasing the clutch K0, for example, if the SOC of the battery 25 has declined or if the required drive force has increased, then the engine 1 is started and the motive power thereof is transmitted to the power transmission system via the clutch K0. In other words, since the SOC declines due to the consumption of the electric power of the battery 25 in the EV mode, then control is executed so as cause the motor to function as an electric generator in order to raise the SOC. The hybrid vehicle in this concrete example is a two-motor vehicle, and therefore it is possible to control both motor-generators to perform regeneration, or control one motor-generator to perform regeneration and control the other motor-generator to power travel, or to execute control whereby one motor-generator is controlled to perform regeneration and the other motor-generator is corrected. Consequently, a control apparatus for a hybrid vehicle in the concrete example of this invention is configured so as to execute the control described below, in cases where the clutch K0 is kept in a released state and cannot be engaged, due to the occurrence of a problem of some kind, for instance, if a fault has occurred whereby the clutch K0 cannot be operated.

Figure 4:
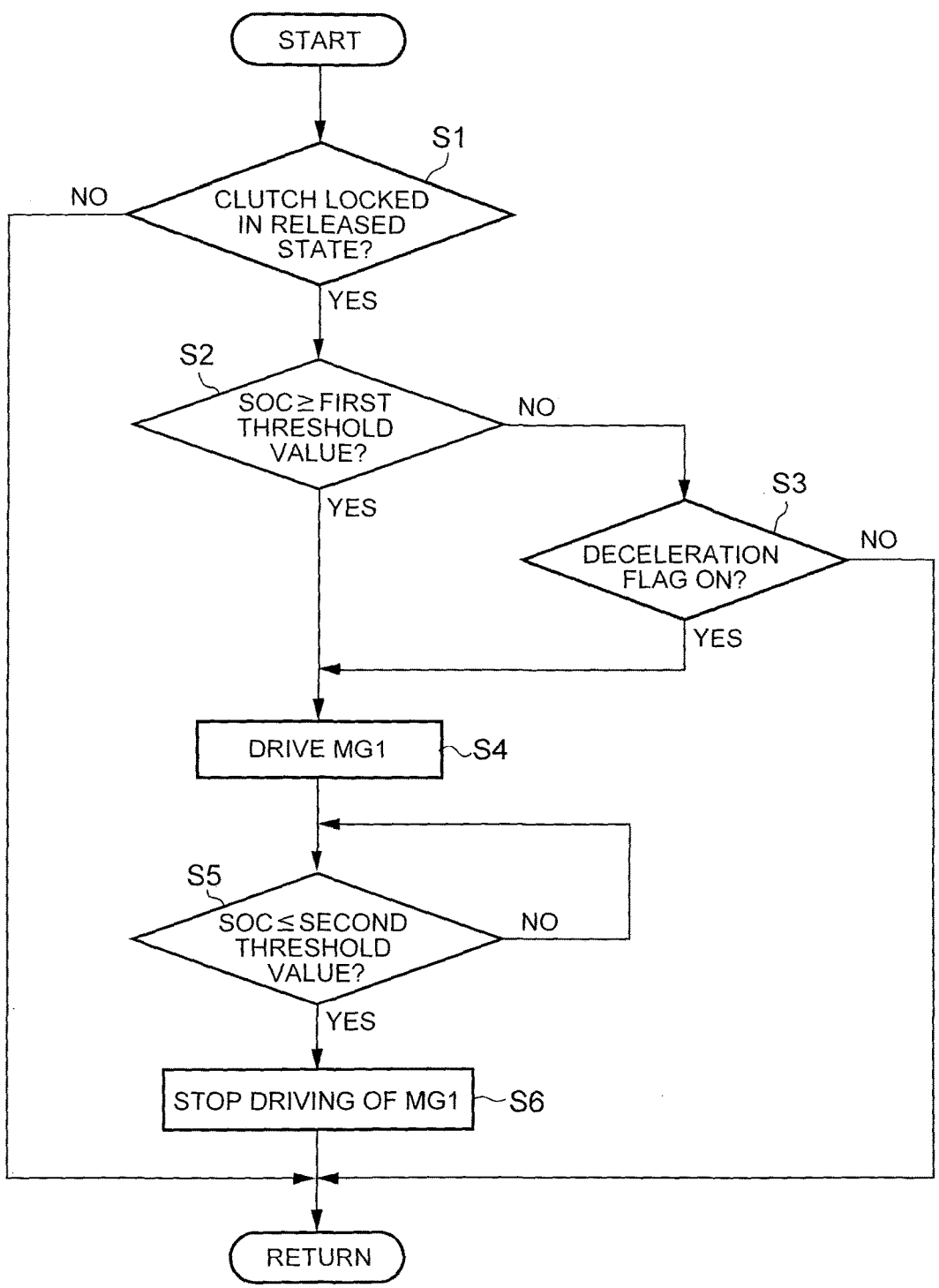
FIG. 4 is a flowchart diagram showing an example of drive control of the first motor executed by the control apparatus of a hybrid vehicle in which the power train shown in FIG. 1 is installed.

Control in a case where the clutch K0 is kept in the released state is described here with reference to FIG. 4. As shown in FIG. 4, firstly, the ECU determines whether or not the clutch K0 is kept in a released state and cannot be switched to an engaged state (step S1). By means of the processing in this step S1, it is determined whether the clutch K0 is locked in a released state, due to a fault in the clutch K0 or the occurrence of a problem of some kind in the actuator. For example, it is possible to adopt a configuration in which it can be determined that the clutch K0 remains released in a locked state and cannot be engaged, by detecting an abnormality, for instance, a case where the actuator is not operating normally despite the fact that a prescribed command signal is outputted to the actuator. In other words, a configuration can be adopted in which it is possible to detect an abnormal state where the clutch K0 is not operating normally, and the cause of this abnormality may lie in the clutch K0 itself or in the actuator. If a negative determination is made in step S1 because the clutch K0 is not locked in a released state, then this routine terminates.

On the other hand, if an affirmative determination is made in step S1 because the clutch K0 is locked in a released state, then it is determined whether or not the SOC of the battery 25 is equal to or greater than a prescribed first threshold value (step S2). This first threshold value is a relatively high value and may be, for example, a prescribed value previously established in order to prevent the battery 25 from becoming overcharged. Furthermore, the processing in step S2 is configured in such a manner that it is determined whether or not it has been predicted that the SOC will become equal to or greater than the first threshold value, if the vehicle continues travelling due to future travel path information, or the like, for instance, if it is predicted that a downhill road is continuing, or the like. If an affirmative determination is made in step S2 due to the fact that the SOC is equal to or greater than the first threshold value, then the procedure advances to step S4. On the other hand, if a negative determination is made at step S2, due to the SOC being smaller than the first threshold value, then it is determined whether or not a deceleration flag, which indicates that the vehicle Ve is decelerating, is in an on state (step S3). A configuration can be adopted wherein the deceleration flag is stored in a storage device of the ECU when, for example, it is detected that the brake pedal has been depressed by the driver, and by the processing in step S3, the presence or absence or a deceleration flag and/or the type of flag can be identified by referring to the data in the storage device. In other words, the processing in step S3 may be configured so that it can be determined whether or not the vehicle Ve is decelerating, and may be configured so that it is determined whether or not deceleration is occurring on the basis of the number of revolutions of the second motor-generator 3 or the number of revolutions of the drive shaft, or the like. If a negative determination is made in step S3, due to the fact that the deceleration flag is off, in other words, because the vehicle Ve is not decelerating, then this routine is terminated.

Furthermore, if an affirmative determination is made in step S3 due to the fact that the deceleration flag is on, then the first motor-generator 2 is driven (step S4). For example, a configuration may be adopted wherein, by the processing in this step S4, the ECU outputs a control command signal to drive the first motor-generator 2, in such a manner that the first motor-generator 2 is driven so as to consume electric power of the battery 25. In other words, according to this routine, control is executed to reduce the SOC of the battery 25.

Thereupon, it is determined whether or not the SOC of the battery 25 has become equal to or less than the prescribed second threshold value, due to the driving and controlling of the first motor-generator 2 (step S5). This second threshold value is a value that is smaller than the first threshold value described above. If the SOC is higher than the second threshold value, then the routine returns and the determination process in step S5 is repeated. On the other hand, if an affirmative determination is made in step S5 due to the fact that the SOC is equal to or less than a second threshold value, then the first motor-generator 2, which is in a driven state, is halted (step S6). For example, a configuration is adopted in which, by the processing in this step S6, a control signal is output to stop the first motor-generator 2.

As described above, according to the control apparatus of the hybrid vehicle in this concrete example, a two-motor type of hybrid vehicle is configured in such a manner that a motor is driven so as to consume electric power if the clutch provided between the engine and the drive wheels is locked in a released state and cannot be engaged, due to a problem of some kind, and therefore it is possible to prevent the amount of electrical charge of the battery from becoming an overcharged state. Consequently, it is possible to prevent the battery from becoming overcharged and reaching a state where regeneration control of the motor becomes impossible, and therefore it is possible to maintain a state of the vehicle in which the regenerative torque produced by regeneration control can be caused to act as a braking torque on the drive wheels.

Figure 5:
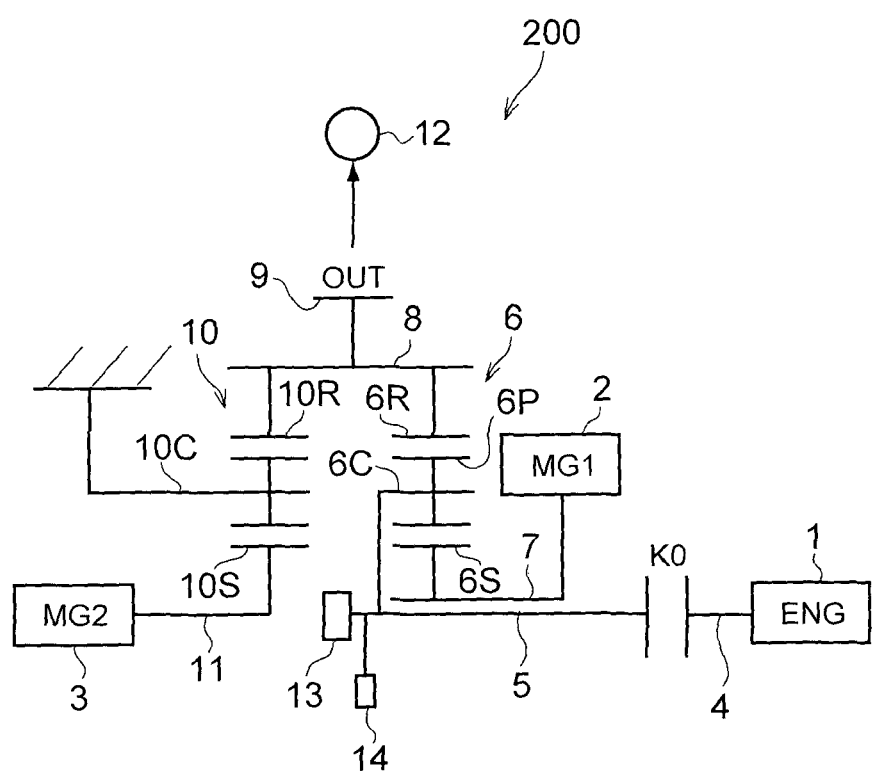
FIG. 5 is a skeleton diagram showing a portion of a modification example of a power train to which this invention can be applied.

Moreover, unlike the concrete example described above, the control apparatus of the hybrid vehicle in this invention can be applied to a vehicle which is configured in such a manner that the oil pump or auxiliary equipment are driven by driving of a first motor-generator. For example, FIG. 5 shows a modification example of a power train to which this invention can be applied. As shown in FIG. 5, in the power train 200 according to this concrete example, the oil pump 13 and auxiliary equipment 14 are configured to rotate in an integrated fashion with the input shaft 5 and so as to rotate in an integrated fashion with the carrier 6c of the power split mechanism 6, and furthermore are coupled to the first motor-generator 2. More specifically, since the rotor shaft of the first motor-generator 2 is configured so as to rotate in an integrated fashion with the sun gear 6S of the power split mechanism 6, then the oil pump 13 and the auxiliary equipment 14 are coupled to the first motor-generator 2 via the power split mechanism 6. In other words, the oil pump 13 and the auxiliary equipment 14 are configured so as to rotate in an integrated fashion with the input shaft 5 which is provided to the side of the drive wheels 12 from the clutch K0, in the power transmission path leading from the engine 1 to the drive wheels 12, and therefore even if the clutch K0 is released, for example, rotation is transmitted from the first motor-generator 2, in such a manner that the vehicle is driven by the first motor-generator 2. Consequently, a configuration is adopted in which the oil pump 13 and the auxiliary equipment 14 are driven by rotation of the input shaft 5, and if the clutch K0 is released, the oil pump 13 and the auxiliary equipment 14 are driven due to the first motor-generator 2 rotating in a forward direction of rotation, or if the clutch K0 is engaged, the oil pump 13 and the auxiliary equipment 14 are driven due to driving of the engine 1. In this concrete example, the first motor-generator 2 is arranged on the side of the engine 1 with respect to the power split mechanism 6 in the axial direction, and the oil pump 13 and the auxiliary equipment 14 are arranged on the opposite side of the power split mechanism 6 from the first motor-generator 2, in the axial direction. Furthermore, the auxiliary equipment 14 may include an air intake apparatus, a lubrication apparatus, a cooling apparatus, or the like, which are not illustrated.

Figure 6:
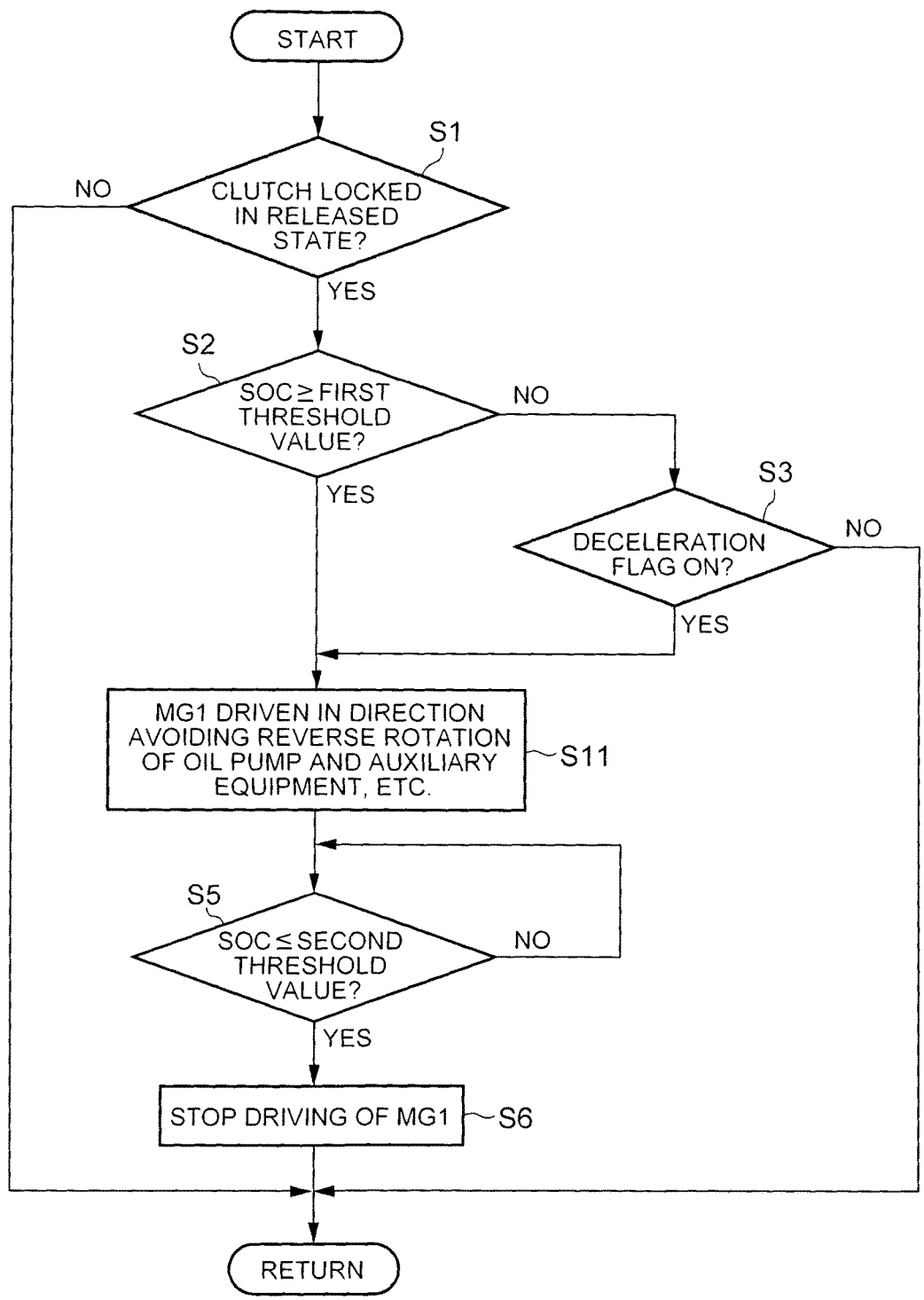
FIG. 6 is a flowchart diagram showing an example of drive control of the first motor executed by the control apparatus of a hybrid vehicle in which the power train shown in FIG. 5 is installed.

Furthermore, FIG. 6 shows one example of a drive control flow of the first motor-generator 2 in the example shown in FIG. 5. The control flow shown in FIG. 6 includes a processing configuration similar to the control flow described above with reference to FIG. 4. More specifically, the processing in steps S1, S2, S3, S5 and S6 described above is composed similarly to the processing of the modification example. Consequently, in the control flow in this concrete example, if the SOC of the battery 25 is equal to or greater than the first threshold value (step S2: Yes), or if the deceleration flag is on (step S3: Yes), then the first motor-generator 2 is driven in a direction of rotation which drives the oil pump 13 and the auxiliary equipment 14 (step S11). In other words, the direction of rotation of the rotor in the first motor-generator 2 which is driven by this drive control is a direction whereby the oil pump 13 and the auxiliary equipment 14 do not rotate in reverse, in other words, a direction of rotation whereby the oil pump 13 and the auxiliary equipment 14 are driven. Consequently, according to this modification example, since the oil pump 13 and the auxiliary equipment 14 are coupled to the first motor-generator 2, the load when driving the first motor-generator 2 is increased, and therefore it is possible to increase the consumption of electric power due to the driving of the first motor-generator 2.

Figure 7:
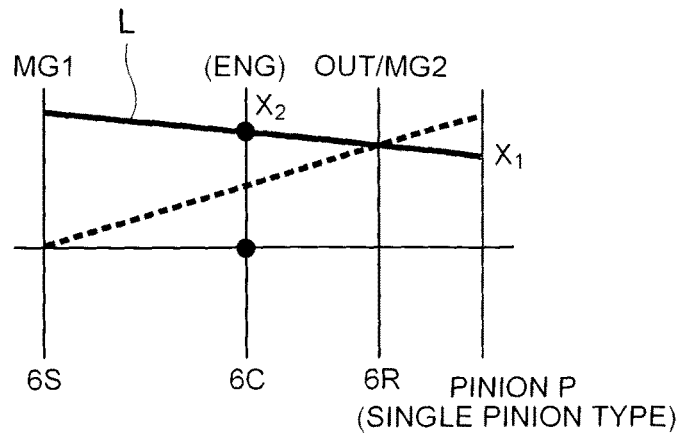
FIG. 7 is an alignment chart showing a state of drive control of the first motor-generator, in a case where a power split mechanism is formed from a single pinion planetary gear mechanism in which the first motor-generator is coupled to a sun gear, the engine is coupled to a carrier via a clutch, and the second motor-generator is coupled to a ring gear.

Furthermore, in the concrete example described with reference to FIG. 1, the rotating elements in the power split mechanism 6 are composed as indicated by the states in the alignment chart shown in FIG. 7. The vehicles to which this invention can be applied include vehicles in which the power split mechanism formed from the planetary gear mechanism having a plurality of rotating elements is configured differently from the concrete example described above, and also include vehicles in which the combination of the rotating elements and the engine and the two motors coupled to these is configured differently from the concrete example described above. Here, the configuration of this modification example has been described using an alignment chart, and in the modification example described here, the rotating elements corresponding to the vertical lines arranged at the right-hand end or the left-hand end of the three vertical lines in the alignment chart are configured so as to be coupled to the output gear 9 and the second motor-generator 3 described above. Moreover, a case is explained in which the clutch K0 described above is provided in the power transmission path leading from the engine 1 to the drive wheels 12, and the clutch K0 is in a released state. In the modification examples described here, the composition similar to the concrete examples described above is not described further and is labelled using the same reference numerals.

Figure 8:
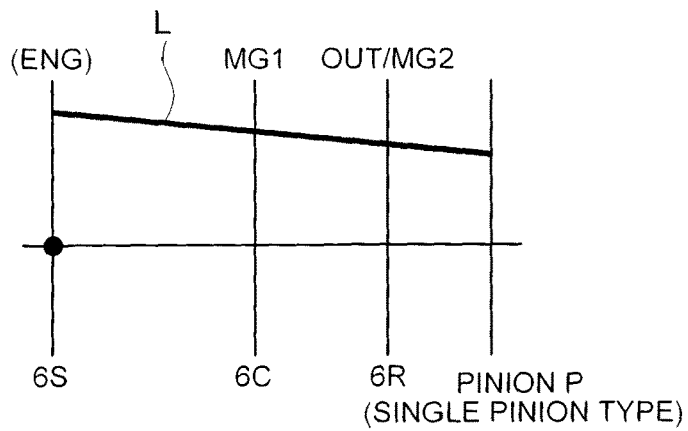
FIG. 8 is an alignment chart showing a state of drive control of the first motor-generator, in a case where a power split mechanism is formed from a single pinion planetary gear mechanism in which the engine is coupled to a sun gear via a clutch, the first motor-generator is coupled a carrier, and the second motor-generator is coupled to a ring gear.
Figure 9:
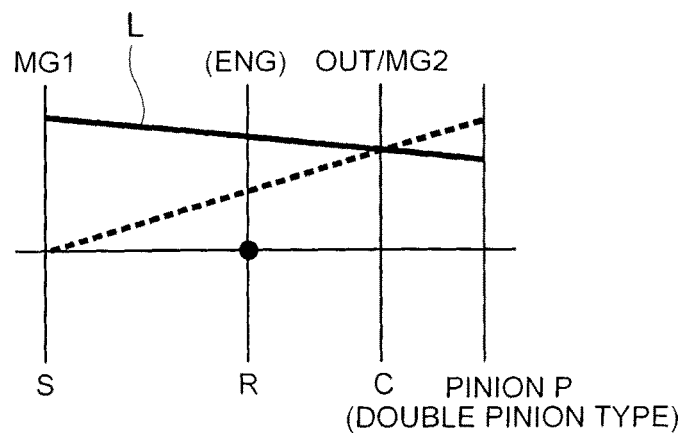
FIG. 9 is an alignment chart showing a state of drive control of the first motor-generator, in a case where a power split mechanism is formed from a double pinion planetary gear mechanism in which the first motor-generator is coupled to a sun gear, the engine is coupled to a ring gear via a clutch, and the second motor-generator is coupled to a carrier.
Figure 10:
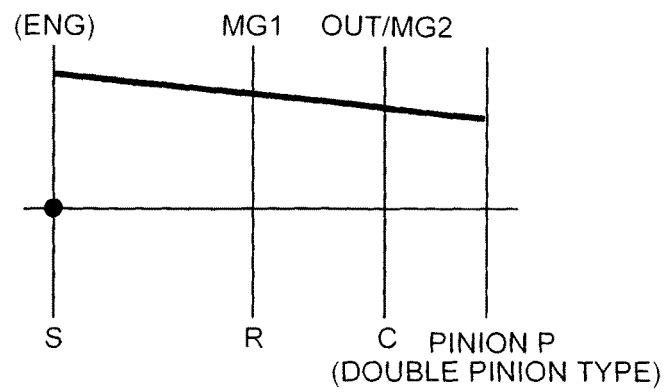
FIG. 10 is an alignment chart showing a state of drive control of the first motor-generator, in a case where a power split mechanism is formed from a double pinion planetary gear mechanism in which the engine is coupled to a sun gear via a clutch, the first motor-generator is coupled a ring gear, and the second motor-generator is coupled to a carrier.
Figure 11:
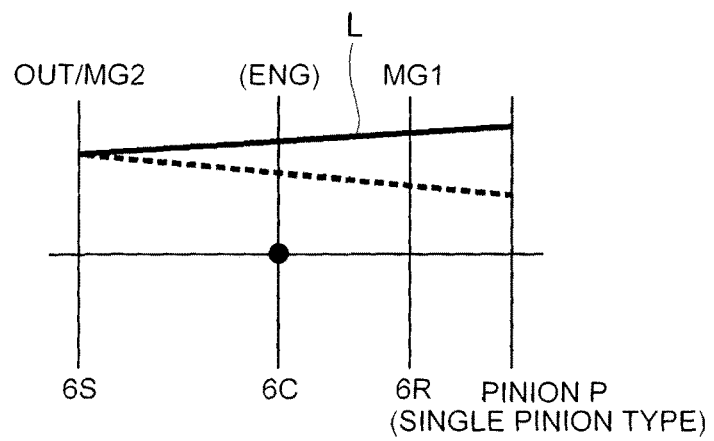
FIG. 11 is an alignment chart showing a state of drive control of the first motor-generator, in a case where a power split mechanism is formed from a single pinion planetary gear mechanism in which the second motor-generator is coupled to a sun gear, the engine is coupled to a carrier via a clutch, and the first motor-generator is coupled to a ring gear.
Figure 12:
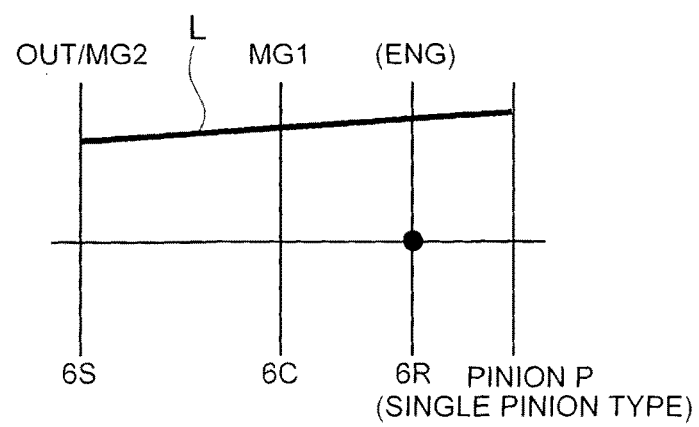
FIG. 12 is an alignment chart showing a state of drive control of the first motor-generator, in a case where a power split mechanism is formed from a single pinion planetary gear mechanism in which the second motor-generator is coupled to a sun gear, the first motor-generator is coupled to a carrier, and the engine is coupled to a ring gear via a clutch.
Figure 13:
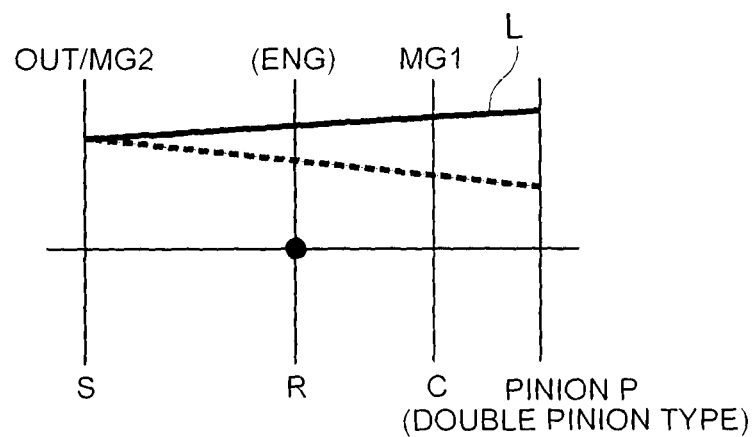
FIG. 13 is an alignment chart showing a state of drive control of the first motor-generator, in a case where a power split mechanism is formed from a double pinion planetary gear mechanism in which the second motor-generator is coupled to a sun gear, the engine is coupled to a ring gear via a clutch, and the first motor-generator is coupled to a carrier.
Figure 14:
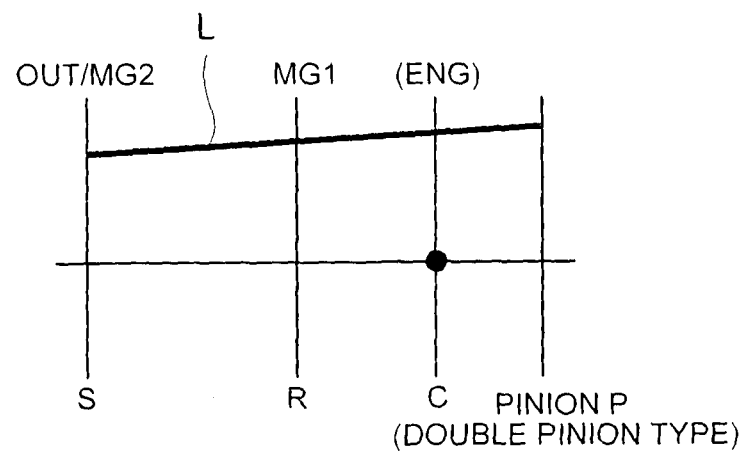
FIG. 14 is an alignment chart showing a state of drive control of the first motor-generator, in a case where a power split mechanism is formed from a double pinion planetary gear mechanism in which the second motor-generator is coupled to a sun gear, the first motor-generator is coupled to a ring gear, and the engine is coupled to a carrier via a clutch.

Firstly, a configuration example is described in which the rotating element which can be represented by the right-hand end vertical line in the alignment chart is an output element and is coupled to the output gear (OUT) 9 and the second motor-generator (MG2) 3. This case includes examples which are configured so as to achieve the states in the alignment charts shown from FIG. 7 to FIG. 10. For example, similarly to the example shown in FIG. 7, in the example shown in FIG. 8, a configuration is adopted in which the power split mechanism 6 is formed from a single pinion planetary gear mechanism, the sun gear 6S, the carrier 6C and the ring gear 6R are arranged from the left-hand side in the drawing, and the ring gear 6R corresponding to the vertical line at the right-hand end is configured to be an output element. In this case, in the example shown in FIG. 7, the first motor-generator 2 is coupled to the sun gear S, and the engine 1 is coupled to the carrier C via the clutch K0, and in the example shown in FIG. 8, the first motor-generator 2 is coupled to the carrier C and the engine 1 is coupled to the sun gear S via the clutch K0. Furthermore, in cases where the power split mechanism is formed from a double pinion planetary gear mechanism having a sun gear S, a ring gear R and a carrier C, as three rotating elements, the rotating elements are arranged in the order of the sun gear S, the ring gear R and the carrier C, from the left-hand side as in the examples indicated in FIG. 9 and FIG. 10, in such a manner that the carrier C corresponding to the vertical line at the right-hand end forms an output element. In this case, in the example shown in FIG. 9, the first motor-generator (MG1) 2 is coupled to the sun gear S, and the engine (ENG) 1 is coupled to the ring gear R via the clutch K0, and in the example shown in FIG. 10, the first motor-generator 2 is coupled to the ring gear R and the engine 1 is coupled to the sun gear S via the clutch K0.

Configuration examples are now described, with reference to the alignment charts shown in FIG. 11 to FIG. 14, in which the output gear (OUT) 9 and the second motor-generator (MG2) 3 are coupled to a rotating element which can be represented by the vertical line at the left-hand end in the alignment chart, as opposed to the examples described above. In the examples shown in FIG. 11 and FIG. 12, similarly to the examples shown in FIG. 7 and FIG. 8 described above, a power split mechanism 6 formed from a single pinion planetary gear mechanism is provided, in such a manner that the sun gear 6S corresponding to the vertical line at the left-hand end forms an output element. In this case, in the example shown in FIG. 11, the first motor-generator 2 is coupled to the ring gear R, and the engine 1 is coupled to the carrier C via the clutch K0, and in the example shown in FIG. 12, the first motor-generator 2 is coupled to the carrier C and the engine 1 is coupled to the ring gear R via the clutch K0. Furthermore, in the examples shown in FIG. 13 and FIG. 14, similarly to the examples shown in FIG. 9 and FIG. 10 described above, a power split mechanism formed from a double pinion planetary gear mechanism is provided, in such a manner that the sun gear S corresponding to the vertical line on the left-hand side forms an output element. In this case, in the example shown in FIG. 13, the first motor-generator 2 is coupled to the carrier C, and the engine 1 is coupled to the ring gear R via the clutch K0, and in the example shown in FIG. 14, the first motor-generator 2 is coupled to the ring gear R and the engine 1 is coupled to the carrier C via the clutch K0.

As described above, in the examples shown in FIG. 7 to FIG. 14, the rotating element corresponding to either the left-hand or right-hand vertical line in the alignment chart is configured to be an output element, and therefore even if the number of revolutions of the first motor-generator 2 which is coupled to another rotating element is higher than the number of revolutions of the rotating element forming the output element, all of the rotating elements apart from the output element in the power split mechanism will be in a state of faster rotation than the output element. Therefore, since the examples indicated in FIG. 7 to FIG. 14 show a state where the clutch K0 is released, it is possible to consume the electric power of the battery 25 by executing drive control so as to cause the first motor-generator 2 to rotate in a forward direction and to output torque in a forward direction, with the clutch K0 in a released state. In other words, in the control apparatus for a hybrid vehicle according to this invention, a configuration is adopted in which driving of the first motor-generator 2 is controlled with an object other than starting (cranking) the engine 1 or controlling the number of revolutions of the engine 1, and the first motor-generator 2 is driven in order to consume electric power in a state where the clutch K0 connecting the engine 1 and the power transmission system has been released, thereby interrupting the connection therebetween. Moreover, as described above, by controlling driving of the first motor-generator 2 in such a manner that the number of revolutions of the MG1 is higher than the number of revolutions of the output element, it is possible to increase the amount of electric power consumed thereby. In FIG. 7 to FIG. 14 and FIG. 16 described below, the black dots which are depicted so as to link the horizontal lines indicate the engine 1 in a stopped state, and show that the rotation of the engine 1 has stopped.

In addition to this, regardless of whether the power split mechanism formed from this planetary gear mechanism is a single pinion or a double pinion mechanism, in the states of the alignment charts shown in FIG. 7 to FIG. 14, the autonomous number of revolutions of the pinion gear P becomes higher, the larger the gradient of the solid line L which indicates the state of rotation of the respective rotating elements. For instance, to describe the autonomous number of revolutions of the pinion gear P by using the alignment chart shown in FIG. 7, the vertical line corresponding to the pinion gear P is shown on the right-hand end of the vertical lines indicating the rotating elements, and if the length from the horizontal line to a point of intersection X1 between the vertical line of the pinion gear P and the abovementioned solid line L, is taken as Y1, and the length from the horizontal line to a point of intersection X2 between the vertical line corresponding to the carrier C and the solid line L, is taken as Y2, then the autonomous number of revolutions of the pinion gear P is represented by the deviation between the length Y2 and the length Y1. Consequently, in a state where the number of revolutions MG1 is greater than the number of revolutions of the output element, by driving the first motor-generator 2 so as to enlarge the differential between the number of revolutions of the MG1 and the number of revolutions of the output element, the gradient of the solid line L is increased and therefore the autonomous number of revolutions of the pinion gear P is increased, the load on the first motor-generator 2 is raised, and the consumption of electric power is increased. Therefore, in the examples shown in FIG. 7 to FIG. 14, since the clutch K0 is in a released state and the first motor-generator 2 is driven in a direction which increases the energy loss, then the consumption rate of the SOC of the battery 25 rises, and it is possible to prevent the battery 25 from becoming overcharged.

Furthermore, in the control apparatus for a hybrid vehicle according to one example of this invention, a configuration is adopted wherein, if the vehicle Ve is travelling backwards, then the first motor-generator 2 is prohibited from being controlled and driven so as to promote the consumption of the electric power of the battery 25 in a situation where the clutch K0 is locked in a released state as described above. One example of control for prohibiting the driving and controlling of the first motor-generator 2 so as to consume electric power during backwards travel is shown as a control flow in FIG. 15. In the control example shown in FIG. 15, the composition that is similar to the control processing described above with reference to FIG. 4 is not explained further here.

Figure 15:
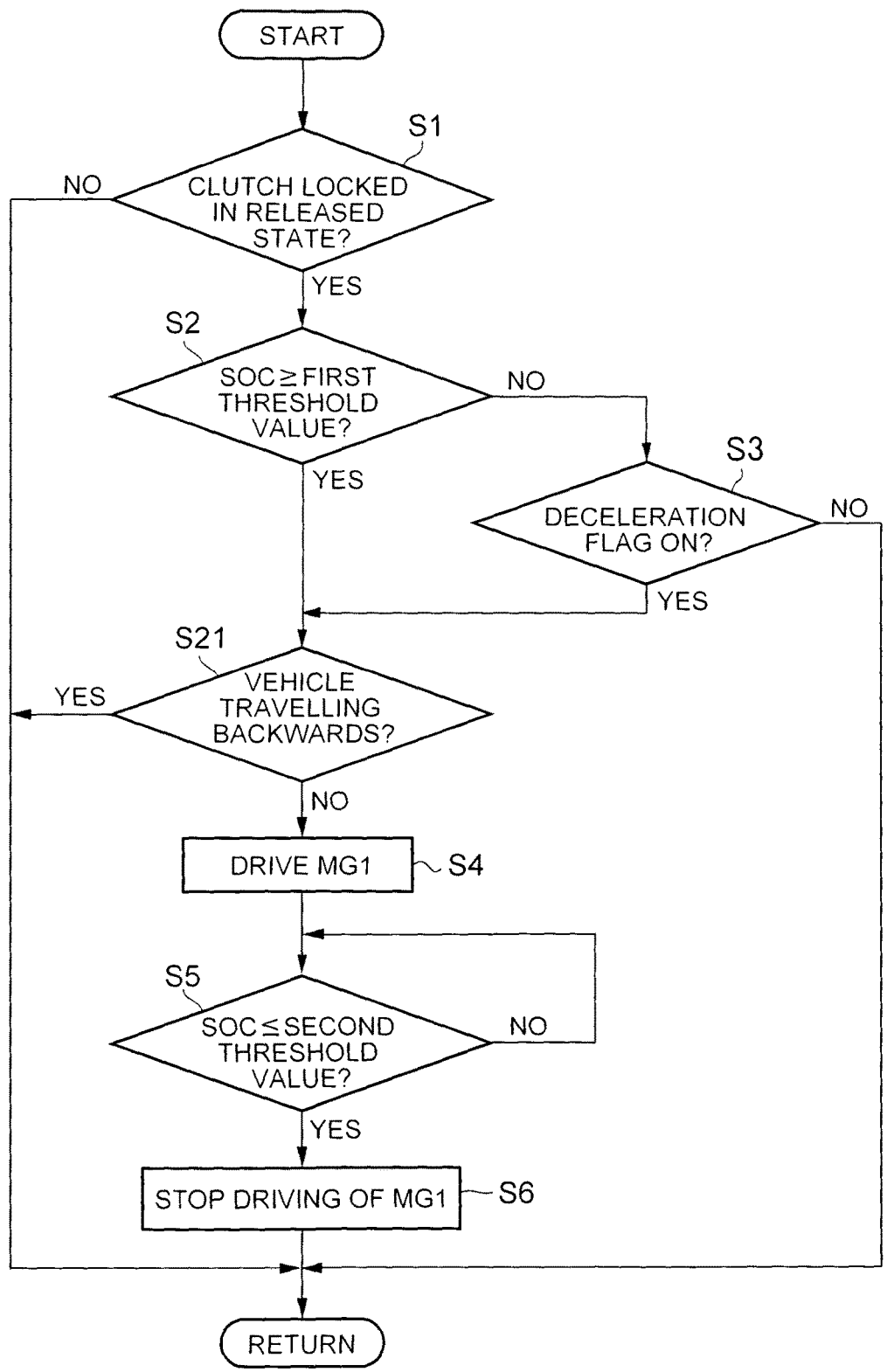
FIG. 15 is a flowchart showing an example of control for executing drive control for consuming electric power in the first motor-generator, when the vehicle is travelling forwards.

More specifically, in the control example shown in FIG. 15, if the SOC of the battery 25 is equal to or greater than the first threshold value (step S2: Yes), or if the deceleration flag is on (step S3: Yes), then it is determined whether or not the vehicle Ve is travelling backwards (step S21). For example, the processing in step S21 may be configured in such a manner that it is determined whether or not the vehicle Ve is travelling backwards by the direction of rotation of the output gear 9, or the direction of rotation of the output shaft 8, or the direction of rotation of the second motor generator 3. In other words, in cases where it is detected that the output shaft 8 is rotating in the negative direction of rotation, or the like, it is determined that the vehicle Ve is travelling backwards. More specifically, the processing in step S21 may be configured so as to determine whether or not a backwards travel flag, which is capable of identifying that the vehicle Ve is travelling backwards, is on. If an affirmative determination is made in step S21 because the vehicle Ve is travelling backwards, then the routine is terminated. Furthermore, a configuration may be adopted in which, if an affirmative determination is made in step S21, then a command signal is output to prohibit the first motor-generator 2 from being driven so as to consume the electric power of the battery 25 as described above. On the other hand, a configuration is adopted in which, if a negative determination is made in step S21 because the vehicle Ve is not travelling backwards, then the procedure advances to step S4 described above and drive control is executed so as to drive the first motor-generator 2 in order to consume the electric power of the battery 25. A case where a negative determination is made in step S21 includes a case where the vehicle Ve is travelling forwards.

Figure 16:
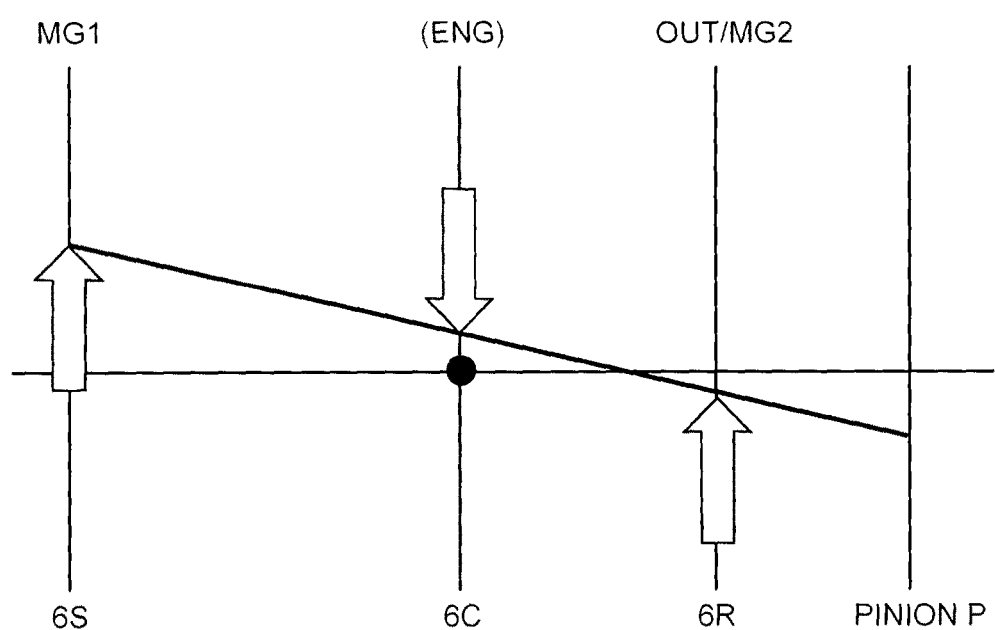
FIG. 16 is an alignment chart showing one example of a state where regeneration control of the second motor generator is executed, as well as executing drive control of the first motor-generator, during backwards travel.

For example, if the drive control of the first motor-generator 2 is performed so as to consume electric power while the vehicle Ve is travelling backwards, there is a possibility that the torque of MG1 may be transmitted as a drive torque to accelerate the vehicle Ve in a backwards direction, and an acceleration that is not intended by the driver may occur. For instance, if drive control is executed to cause the first motor-generator 2 described above to consume electric power of the battery 25 during backward travel and during deceleration, as shown in FIG. 16, then the torque of the first motor-generator 2 acts as a torque in a negative direction on the ring gear R, which is an output element, by a levering action, and therefore the torques produced by the motor-generators 2, 3 act in respectively opposing directions in the ring gear R. Consequently, there are also cases where the braking torque produced by the second motor-generator 3 is decreased by the torque produced by the first motor-generator 2, and cases where the torque due to the first motor-generator 1 has a greater action than the braking torque and therefore the vehicle accelerates in a backwards direction. In the aspect shown in FIG. 16, since the clutch K0 provided between the engine 1 and the power split mechanism 6 is released, then the transmission of torque between the engine 1 and the carrier C is interrupted.

However, as described above with reference to FIG. 15, according to this concrete example, a configuration is provided in which the vehicle Ve can be controlled so as not to execute drive control of the first motor-generator 2 described above during backwards travel, and therefore it is possible to prevent the vehicle Ve from behaving in a manner unintended by the driver, due to the torque of the MG1 during backwards travel of the vehicle Ve. In particular, by providing a configuration in which drive control of the first motor-generator 2 as described above is prohibited during backwards travel of the vehicle Ve and during deceleration, then it is possible to cause the torque of MG2 (regeneration torque) which is outputted from the second motor-generator 3, to act as a braking force on the drive wheels 12. In other words, it is possible to use the MG2 torque as a braking torque in a state where the effect of the MG1 torque during backwards travel has been reduced, and it is possible to cause a regenerative torque produced by the second motor-generator 3 to act on the drive wheels 12 as a braking torque which satisfies the required braking force.

Figure 17:
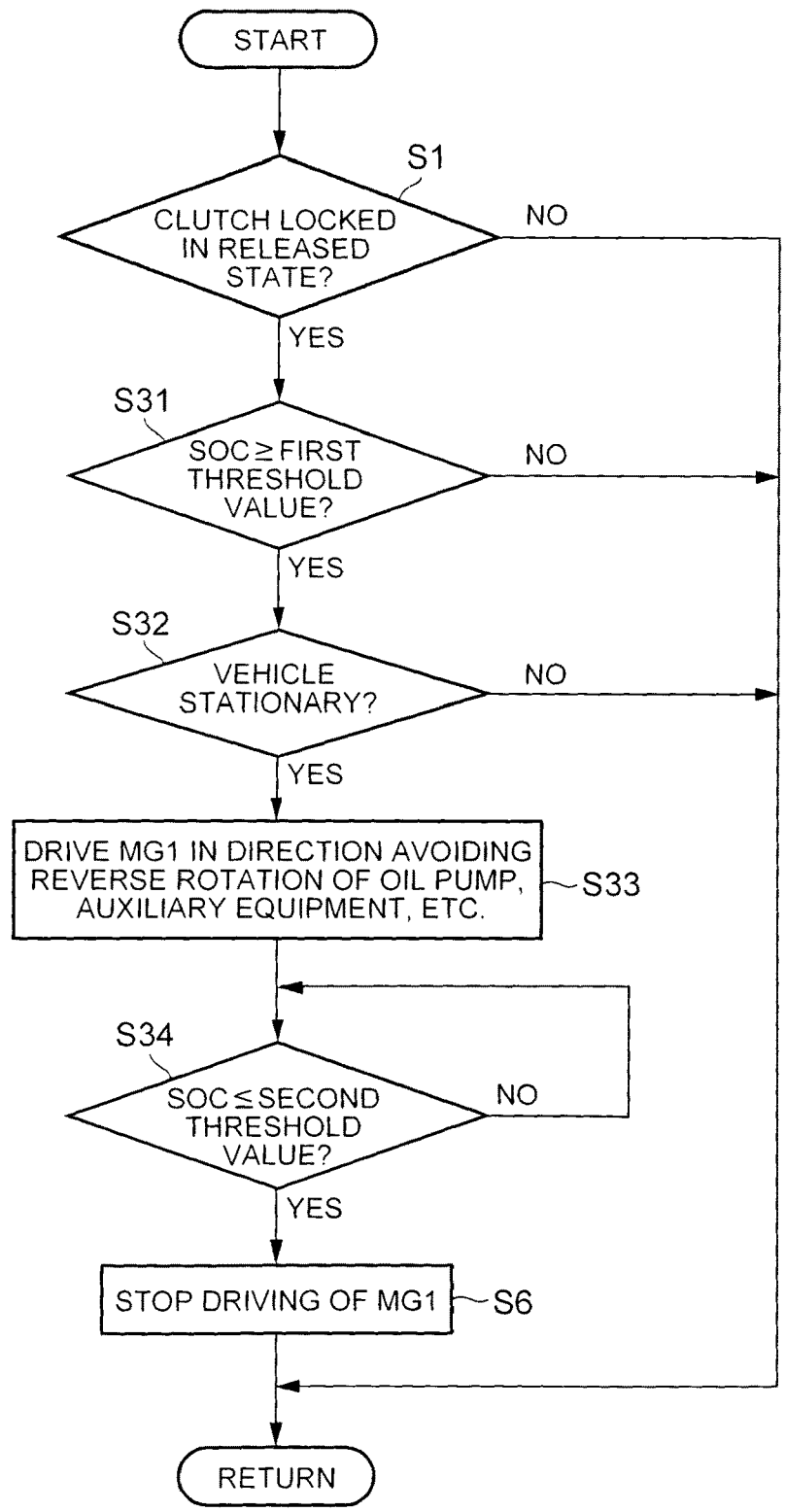
FIG. 17 is a flowchart showing an example of control for executing drive control for consuming electric power in the first motor-generator, when the vehicle is stationary.

Furthermore, in a control apparatus for a hybrid vehicle according to one example of this invention, it is possible to adopt a configuration in which the drive control of the first motor-generator 2 is performed so as to consume electric power of the battery 25, while the vehicle Ve is stopped. FIG. 17 shows an example of this control, and a concrete description of this example is given here with reference to FIG. 17, in addition to which the composition that is similar to the concrete examples described above is not explained further here and is labelled with the same reference numerals. As shown in FIG. 17, if an affirmative determination is made in step S1 because the clutch K0 is locked in a released state, then it is determined that the SOC of the battery 25 is equal to or greater than a prescribed first threshold value (step S31). The first threshold value is a relatively high value and may be, for example, a prescribed value previously established in order to prevent the battery 25 from becoming overcharged. The first threshold value in the processing in this step S31 may be set to a different value to the first threshold value in the processing in step S2 described above with reference to FIG. 6. If a negative determination is made in step S31, because the SOC is lower than the first threshold value, then this routine is ended.

On the other hand, if an affirmative determination is made in step S31 because the SOC is equal to or greater than the first threshold value, then it is determined whether or not the vehicle Ve is stationary (step S32). The processing step S32 may be confirmed in such a manner that it is determined whether or not the number of revolutions of the output shaft 8 is zero, or less than a previously established prescribed number of revolutions which is close to zero. If a negative determination is made in step S32 because the vehicle Ve is not stationary, in other words, because the vehicle is travelling, then this routine is terminated. On the other hand, if an affirmative determination is made in step S32 because the vehicle Ve is stationary, then the first motor-generator 2 is driven so as to consume electric power of the battery 25 (step S33). In the drive control process according to step S33, if the example of the power train shown in FIG. 5, for instance, is provided, then the first motor-generator 2 is controlled to be driven in a direction of rotation for driving the oil pump 13 and/or the auxiliary equipment 14, in other words, a direction that does not cause reverse rotation of the oil pump 13, and the like. In other words, step S33 may be configured similarly to the processing configuration of step S11 shown in FIG. 6 described above.

Thereupon, it is determined whether or not the SOC has become equal to or less than the prescribed second threshold value, due to the drive control of the first motor-generator 2 (step S34). The second threshold value in this step S34 may be set to a value which is smaller than the first threshold value in step S31 described above and is different to the second threshold value in step S2 described above with reference to FIG. 6. In this case, the second threshold value in step S34 may be set to a value greater than the second threshold value in step S2. In this way, by setting the second threshold value which is set while the vehicle is stationary to a value greater than the second threshold value which is set when the vehicle is travelling, it is possible to guarantee a SOC that enables the vehicle Ve to travel by the power of the motor when starting off from a stationary state. If a negative determination is made in step S34 because the SOC is higher than the second threshold value, then the routine returns and the determination process in step S34 is repeated. On the other hand, if an affirmative determination is made in step S34 because the SOC is equal to or lower than the second threshold value, then the procedure advances to step S6, and the first motor-generator 2 which is being driven in accordance with the control in step S33, is stopped.

Moreover, the control apparatus for a hybrid vehicle in a modification example of the invention may be configured in such a manner that the drive control when the vehicle is stationary described above is started if it is detected that a prescribed manual switched provided in the vehicle Ve has been operated by the driver. This manual switch is detection means provided in the periphery of the driver's seat in the vehicle cabin, for example, which is configured so as to receive a manual operation by the driver. For example, a configuration is adopted in which, if this manual switch is turned on by the driver, then by detecting this manual operation, the drive control in step S33 shown in FIG. 17 described above is carried out. Even in a case where the drive control is started by detecting this manual switch, if the SOC is equal to or lower than the second threshold value described above, the driving of the first motor-generator 2 is stopped by the control in step S6 described above.

Here, to describe the correspondence between the control apparatus for a hybrid vehicle in this invention, and the concrete example described above, the first motor in this invention corresponds to the first motor-generator 2 in the concrete example described above, and the second motor in this invention corresponds to the second motor-generator 3 in the concrete example described above.

In the explanation given above, according to the control apparatuses for a hybrid vehicle in the respective concrete examples, even if a state occurs where the clutch is kept in a released state and cannot be engaged, in a hybrid vehicle which is provided with a clutch in the power transmission path leading from the engine to the drive wheels, the control apparatus is configured so as to drive the first motor-generator in order to consume electric power of the battery, if the amount of electrical charge has become greater than the first threshold value, and therefore overcharging of the battery can be prevented. Consequently, since the electric power generated by the second motor-generator functioning as an electric generator can be charged to a battery, then the regenerative torque produced by the second motor-generator during deceleration, for example, can be transmitted to the drive wheels as braking torque. In this way, the MG2 torque produced by regeneration control of the second motor-generator can be used as braking torque, and therefore if the vehicle is decelerating continuously, for example, on a downhill road, or the like, then it is possible to reduce the frequent operation of the brake pedal, and hence the durability of the brakes can be improved. Moreover, in cases where the clutch cannot be engaged, it is possible to prevent overcharging of the battery, as well as being able to ensure that the battery contains the amount of electric power required for motor-powered travel. In other words, the SOC can be kept in a state which enables travel of the hybrid vehicle and halting of the hybrid vehicle.

Furthermore, if it is predicted that the amount of electrical charge in the battery will become higher than the first threshold value, then drive control can be executed to prevent overcharging in advance. For instance, if road information from a car navigation system, or the like, indicates that the travel path of the vehicle includes a downhill road if the vehicle continues travelling and if, for example, that downhill road has a long length or steep gradient, or the like, then it is possible to prevent situations where the battery becomes overcharged and the motor torque cannot be used as a braking torque, during travel along the downhill road, even in cases where the clutch is locked in a released state.

The engine, the first motor-generator and the second motor-generator which constitute the motive power sources have mutually different power characteristics or drive characteristics. For example, the engine can operate in a broad range of operation from a region of low torque and low number of revolutions to a region of high torque and high number of revolutions, and has good energy efficiency in the region where the torque and number of revolutions are relatively high. On the other hand, the first motor-generator which outputs motive power acting as a control and drive torque to regulate the number of revolutions of the engine, and the crank angle when stopping rotation of the engine, and so on, outputs a large torque at a low number of revolutions. Furthermore, the second motor-generator which outputs torque to the drive wheels can be operated at a higher number of revolutions than the first motor-generator, and the maximum torque thereof is smaller than the first motor-generator. Consequently, the vehicle to which the invention is applied is controlled so as to achieve good energy efficiency or fuel efficiency, by efficient utilization of the engine and the respective motor-generators that constitute the motive power sources.

The invention claimed is:

1. A control apparatus for a hybrid vehicle, the hybrid vehicle including an engine, a first motor, a second motor, a storage device, a first rotating element, a second rotating element, a third rotating element, an output member, a power split mechanism and a clutch, the first motor and the second motor respectively having an electricity generating function, the storage device supplying electric power for driving the first motor and the second motor and being charged with electric power generated by at least one of the first motor and the second motor, the first rotating element being coupled to the engine, the second rotating element being coupled to the first motor, the third rotating element being coupled to the output member and the second motor, the power split mechanism producing a differential action in the first rotating element, the second rotating element and the third rotating element, and the clutch being provided in a power transmission path leading from the engine to drive wheels, the clutch transmitting torque between the engine and the drive wheels when engaged, the clutch interrupting the transmission of torque between the engine and the drive wheels when released, the control apparatus comprising:
    an ECU for controlling, due to a malfunction, a regeneration control for the second motor in a released state of the clutch, the ECU configured to, when the clutch is kept in the released state and the clutch cannot be engaged and an amount of electrical charge of the storage device is higher than a prescribed first threshold value, and when the vehicle decelerates, execute the regeneration control for the second motor in order to consume electric power of the storage device by driving the first motor so that regenerative torque and motor torque produced by the second motor during the regeneration control is applied to the drive wheels as brake torque.

2. The control apparatus according to claim 1, wherein the ECU is configured to stop the drive control when the amount of electrical charge has become lower than a second threshold value due to the drive control, the second threshold value is a value smaller than the first threshold value.

3. The control apparatus according to claim 1, wherein the ECU is configured to execute the drive control when the amount of electrical charge is predicted to become higher than the first threshold value.

4. The control apparatus according to claim 1, wherein the hybrid vehicle includes an oil pump and auxiliary equipment coupled to the first motor, and
the ECU is configured to cause the first motor subjected to the drive control to rotate in a direction of rotation for driving the oil pump and the auxiliary equipment.

5. The control apparatus according to claim 1, wherein the power split mechanism is a single pinion planetary gear mechanism that includes a sun gear, a carrier and a ring gear as the rotating elements, the third rotating element is either the sun gear or the ring gear, and
the ECU is configured to execute the drive control in such a manner that the number of revolutions of the first rotating element is greater than the number of revolutions of the third rotating element.

6. The control apparatus according to claim 1, wherein the power split mechanism is a double pinion planetary gear mechanism that includes a sun gear, a carrier and a ring gear as the rotating elements, the third rotating element is either the sun gear or the carrier, and
the ECU is configured to execute the drive control in such a manner that the number of revolutions of the first rotating element is greater than the number of revolutions of the third rotating element.

7. The control apparatus according to claim 1, wherein the ECU is configured to execute the drive control when the vehicle does not travel backwards.

8. A control method for a hybrid vehicle, the hybrid vehicle including an engine, a first motor, a second motor, a storage device, a first rotating element, a second rotating element, a third rotating element, an output member, a power split mechanism, a clutch, and an ECU, the first motor and the second motor respectively having an electricity generating function, the storage device supplying electric power for driving the first motor and the second motor and being charged with electric power generated by at least one of the first motor and the second motor, the first rotating element being coupled to the engine, the second rotating element being coupled to the first motor, the third rotating element being coupled to the output member and the second motor, the power split mechanism producing a differential action in the first rotating element, the second rotating element and the third rotating element, and the clutch being provided in a power transmission path leading from the engine to drive wheels, the clutch transmitting torque between the engine and the drive wheels when engaged, and the clutch interrupting the transmission of torque between the engine and the drive wheels when released, the control method comprising:
during a malfunction, executing a regeneration control for the second motor in a released state of the clutch with the ECU in order to consume electric power of the storage device by driving the first motor, the ECU executes the regeneration control of the second motor when the clutch is kept in the released state and the clutch cannot be engaged, and an amount of electrical charge of the storage device is higher than a prescribed first threshold value, and when the vehicle decelerates, so that regenerative torque and motor torque produced by the second motor during the regeneration control is applied to the drive wheels as brake torque.

9. The control method according to claim 8, wherein the drive control is stopped by the ECU when the amount of electrical charge has become lower than a second threshold value due to the drive control, the second threshold value is a value smaller than the first threshold value.

10. The control method according to claim 8, wherein the drive control is executed by the ECU, when the amount of electrical charge is predicted to become higher than the first threshold value.

11. The control method according to claim 8, wherein the hybrid vehicle includes an oil pump and auxiliary equipment coupled to the first motor, and
the first motor subjected to the drive control is caused by the ECU to rotate in a direction of rotation for driving the oil pump and the auxiliary equipment.

12. The control method according to claim 8, wherein
the power split mechanism is a single pinion planetary gear mechanism that includes a sun gear, a carrier and a ring gear as the rotating elements, the third rotating element is either the sun gear or the ring gear, and
the drive control is executed by the ECU in such a manner that the number of revolutions of the first rotating element is greater than the number of revolutions of the third rotating element.

13. The control method according to claim 8, wherein
the power split mechanism is a double pinion planetary gear mechanism that includes a sun gear, a carrier and a ring gear as the rotating elements, the third rotating element is either the sun gear or the carrier, and
the drive control is executed by the ECU in such a manner that the number of revolutions of the first rotating element is greater than the number of revolutions of the third rotating element.

14. The control method according to claim 8, wherein the drive control is executed by the ECU when the vehicle does not travel backwards.

* * * * *